United States Patent
Derus et al.

(10) Patent No.: US 10,093,008 B2
(45) Date of Patent: Oct. 9, 2018

(54) BALL STUD SEPARATOR TOOL

(71) Applicant: Caterpillar Inc., Peoria, IL (US)

(72) Inventors: Nick Derus, Milwaukee, WI (US); Scott Sells, East Peoria, IL (US); Chad Thompson, Bartonville, IL (US); Brian Todd Potter, Fennville, MI (US); Karl F. Reith, Auburn, IN (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/350,211

(22) Filed: Nov. 14, 2016

(65) Prior Publication Data

US 2018/0133874 A1    May 17, 2018

(51) Int. Cl.
*B23P 19/04*    (2006.01)
*B25B 27/00*    (2006.01)
*B62D 7/16*     (2006.01)

(52) U.S. Cl.
CPC .......... *B25B 27/0035* (2013.01); *B62D 7/166* (2013.01)

(58) Field of Classification Search
USPC .................. 29/239, 252, 253, 256, 267, 275
See application file for complete search history.

(56) References Cited

U.S. PATENT DOCUMENTS

| | | | | |
|---|---|---|---|---|
| 2,075,792 A * | 4/1937 | Curtiss | ................. | B25B 27/062 29/257 |
| 4,624,039 A * | 11/1986 | Lawrence | ............. | B25B 27/023 29/257 |
| 4,651,596 A * | 3/1987 | Rachanski | ............. | B25B 13/44 29/264 |
| 4,869,482 A | 9/1989 | Beccaceci | | |
| 6,665,918 B1 * | 12/2003 | Williams | ............. | B25B 27/023 29/252 |

* cited by examiner

*Primary Examiner* — Joseph J Hail
*Assistant Examiner* — Shantese McDonald
(74) *Attorney, Agent, or Firm* — Miller, Matthias & Hull; Jeff A. Greene (57) ABSTRACT

An adapter for a ball stud separator tool may include a cylindrical body. The cylindrical body may include a threaded end and a mating end oppositely facing the threaded end. A plurality of adapter threads may be recessed into the cylindrical body proximate the threaded end and may be configured to threadably receive a plurality of ball stud threads of a ball stud. A flared cylindrical wall may be recessed into the cylindrical body proximate the mating end. The flared cylindrical wall may terminate at a curved seat disposed in the cylindrical body.

20 Claims, 5 Drawing Sheets

BALL STUD SEPARATOR TOOL

TECHNICAL FIELD

The present disclosure relates generally to ball joints and, more particularly, relates to ball stud separator tools for industrial vehicles.

BACKGROUND

The steering assemblies of various industrial vehicles such as, but not limited to, off-highway trucks, on-highway trucks, wheel dozers, and wheel loaders, may include steering components that are operably coupled together via ball studs and pin-cylinders. Over the life time of the industrial vehicle, for example, a tapered ball stud or tapered pin-cylinder may become wedged and/or corroded into its corresponding tapered bore. As such, the tapered ball stud or tapered pin-cylinder may be difficult to remove during servicing of the steering assembly of the industrial vehicle.

Some prior techniques to remove or separate the tapered ball stud from its corresponding tapered bore have involved conventional industrial floor jacks positioned underneath the industrial vehicle. With such techniques, however, the weight of the industrial vehicle may potentially drop against the industrial floor jack after the tapered ball stud breaks loose from its corresponding tapered bore. In such instances, for example, the steering box, steering arms, and frame lugs, as well as other components, of the steering assembly may bend and become damaged resulting in increased downtime of the industrial vehicle due to repairing or replacing the damaged components.

Other techniques for ball stud separation or removal have also been attempted. For example, U.S. Pat. No. 4,869,482 ('482 patent) discloses a tool for loosening a seized ball joint in a motor vehicle. The tool of the '482 patent includes a handle and a jaw having a wedged shaped seat for positioning onto a ball joint. With the tool in position with the ball joint, a hammer is used to strike the handle to loosen the ball joint. While the tool of the '482 patent loosens the ball joint, the potential for bending of other vehicle components during the loosening process may still be present. Accordingly, improvements in removing tapered ball studs or pin-cylinders from their corresponding tapered bores without causing damage to other components continue to be sought.

SUMMARY

In accordance with an aspect of the disclosure, an adapter for a ball stud separator tool is provided. The adapter may include a cylindrical body. The cylindrical body may include a threaded end and a mating end oppositely facing the threaded end. A plurality of adapter threads may be recessed into the cylindrical body proximate the threaded end and may be configured to threadably receive a second plurality of threads of a ball stud. A flared cylindrical wall may be recessed into the cylindrical body proximate the mating end. The flared cylindrical wall may terminate at a curved seat disposed in the cylindrical body.

In accordance with another aspect of the disclosure, a ball stud separator tool is provided. The ball stud separator tool may include a plurality of guide posts extending upwardly from a lower plate. An upper plate may be slidably coupled to the plurality of guide posts. A hydraulic cylinder may be coupled to the lower plate and may be operably engageable with the upper plate. A load-lock may be coupled to the lower plate and may house the hydraulic cylinder. The load-lock may be operably engageable with the upper plate. A hydraulic breaker may be secured to the upper plate and may include a work tool. An extension may include a rounded head and a receiving chamber. The extension may be receivably engaged with the work tool. An adapter may include a mating cup and a threaded fastener. The mating cup may be receivably engaged with the rounded head of the extension. The threaded fastener may be configured to threadably engage a ball stud.

In accordance with yet another aspect of the disclosure, a ball stud separator system for an industrial vehicle is provided. The ball stud separator system may include a lower plate. A hydraulic cylinder may be coupled to the lower plate. An upper plate may be in movable engagement with the hydraulic cylinder. A load-lock may be coupled to the lower plate and may house the hydraulic cylinder. The load-lock may be operably engageable with the upper plate. A hydraulic breaker may be secured to the upper plate and may include a work tool. An extension may include a rounded head and a receiving chamber. The receiving chamber may be receivably engaged with the work tool. An adapter may include a mating cup and a threaded fastener. The mating cup may include a flared cylindrical wall terminating at a curved seat. The curved seat may be receivably engaged with the rounded head of the extension. The threaded fastener may be threadably engageable with a ball stud of the industrial vehicle.

These and other aspects and features of the present disclosure will be more readily understood upon reading the following detailed description when taken in conjunction with the accompanying drawings. Aspects of different embodiments herein described can be combined with or substituted by one another.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
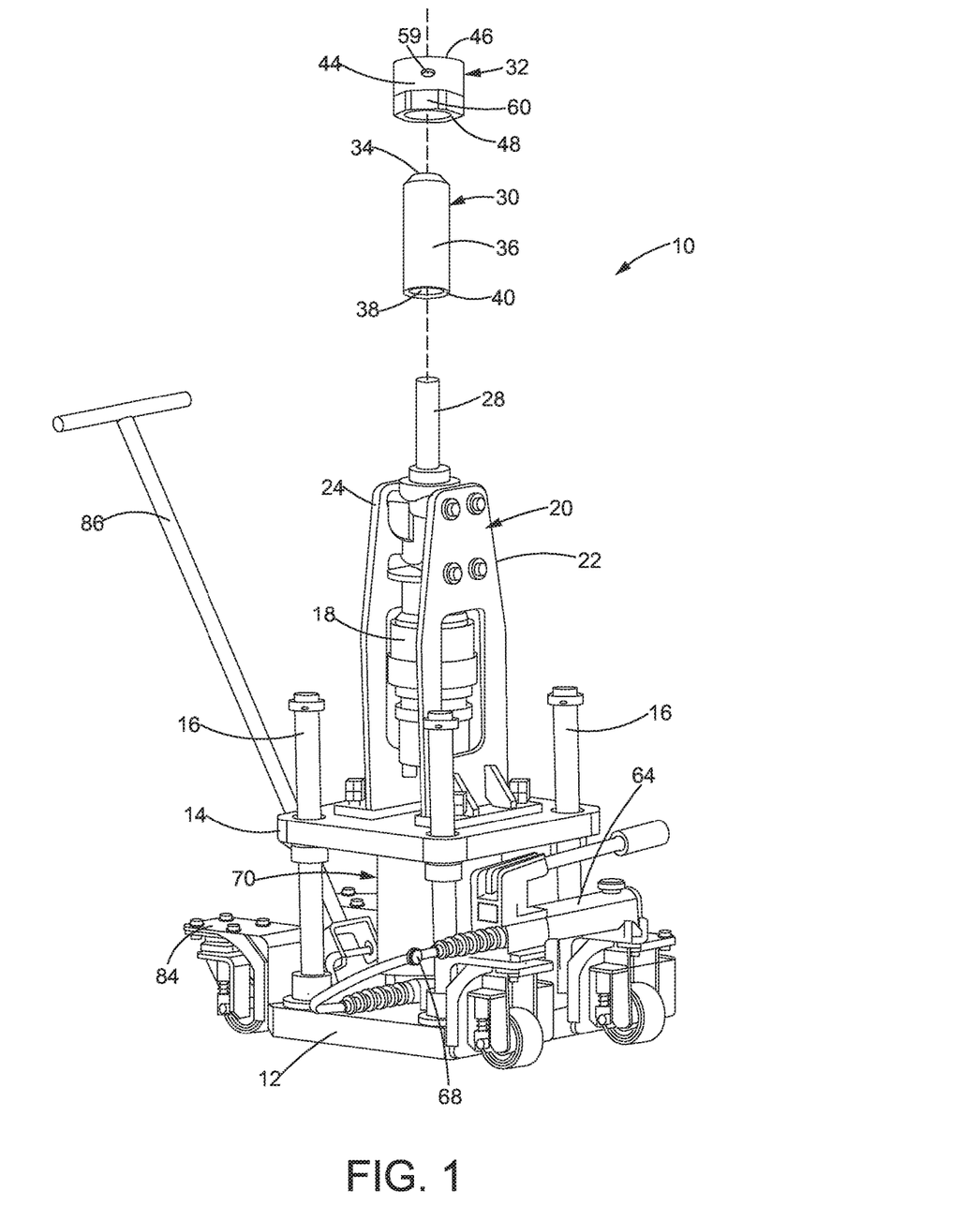
FIG. 1 is a perspective view of a ball stud separator tool illustrating an adapter and an extension in exploded view, in accordance with an embodiment of the present disclosure.

Referring now to FIG. 1, an exemplary ball stud separator tool constructed in accordance with the present disclosure is generally referred to by reference numeral 10. The ball stud separator tool 10 may be utilized to separate ball studs and pin-cylinders from corresponding bores associated with steering assemblies of various industrial vehicles involved in construction, agriculture, earth-moving, and mining industries such as, but not limited to, off-highway trucks, on-highway trucks, wheel dozers, wheel loaders, and other large industrial vehicles well-known in such industries. The ball stud separator tool 10 includes a lower plate 12 and an upper plate 14. A plurality of guide posts 16 extends upwardly from the lower plate 12. In some embodiments, each guide post of the plurality of guide posts 16 is coupled to the lower plate 12 such that one guide post is disposed in each corresponding corner of the lower plate 12. The upper plate 14 is slidably coupled to the plurality of guide posts 16 for operable movement as described in more detail below.

The ball stud separator tool 10 also includes a hydraulic breaker 18. The hydraulic breaker 18 is coupled to the upper plate 14. In some embodiments, the hydraulic breaker 18 includes a plurality of brackets 20, which couple the hydraulic breaker 18 to the upper plate 14. For example, the plurality of brackets 20 may include a first bracket 22 and a second bracket 24 coupled to the upper plate 14. The first bracket 22 may be spaced apart from the second bracket 24 such that the hydraulic breaker 18 is disposed therebetween and securely coupled to both the first and second brackets 22, 24.

The hydraulic breaker 18 includes a base 26 (shown in FIG. 3) and a work tool 28 disposed at an opposite end of the hydraulic breaker 18 from the base 26. The base 26 of the hydraulic breaker 18 is oriented toward the upper plate 14 such that the work tool 28 is oriented vertically upright with respect to the upper plate 14. Moreover, with the plurality of brackets 20 coupling the hydraulic breaker 18 to the upper plate 14, the base 26 of the hydraulic breaker 18 is raised vertically away from the upper plate 14 forming a gap therebetween.

Figures 2, 3:
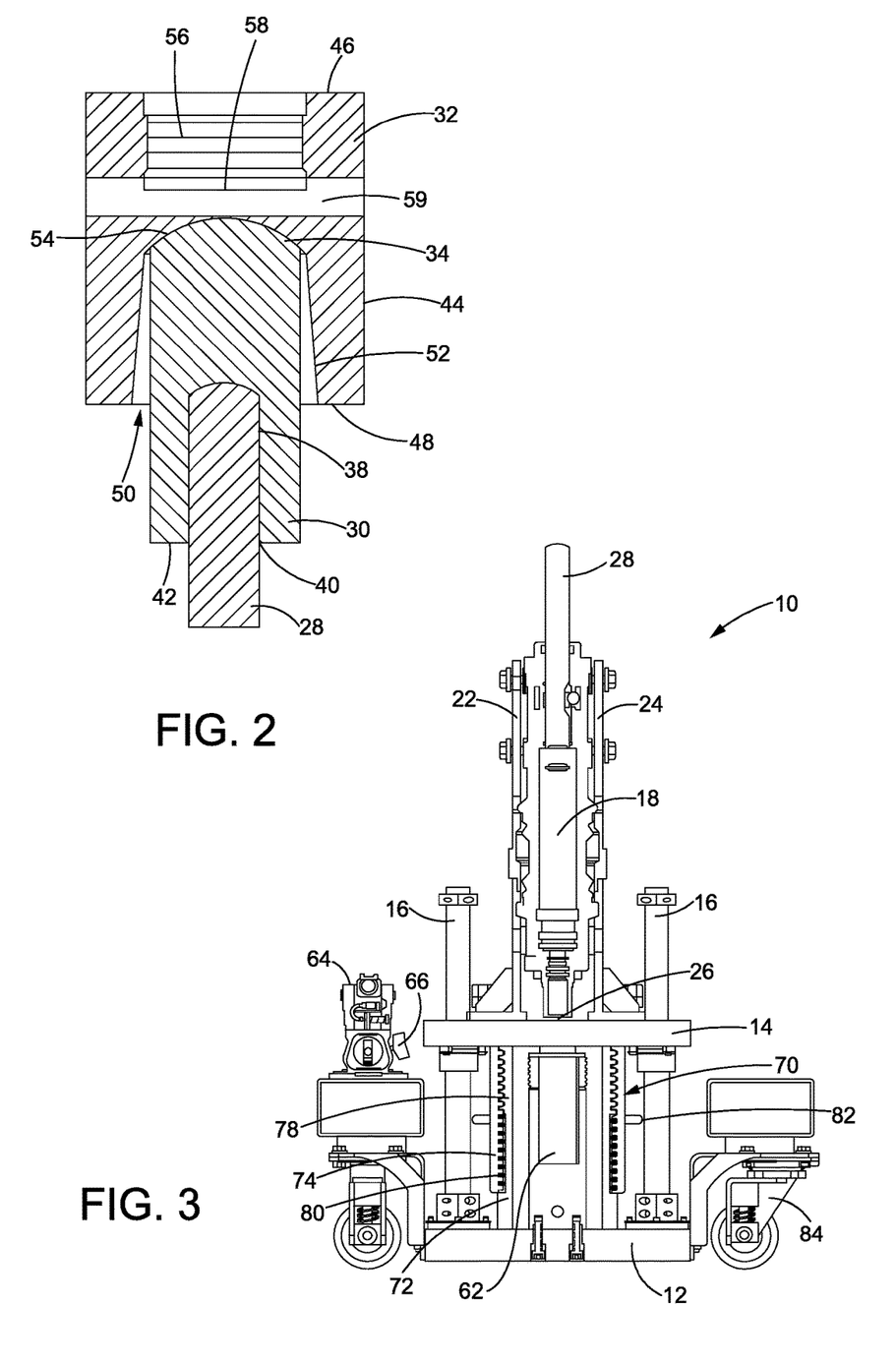
FIG. 2 is cross-sectional view of an adapter, an extension, and a work tool of a ball stud separator tool, in accordance with an embodiment of the present disclosure.
FIG. 3 is side view of a ball stud separator tool in a retracted, unengaged state, in accordance with an embodiment of the present disclosure.

Moreover, with reference to FIGS. 1 and 2, the ball stud separator tool 10 also includes an extension 30 and an adapter 32. The extension 30 includes a rounded head 34, an extension body 36, and a receiving chamber 38. The receiving chamber 38 is recessed into the extension body 36 such that an opening 40 of the receiving chamber 38 is disposed at a receiving end 42 of the extension 30. The extension body 36 is substantially cylindrical and extends between the receiving end 42 of the extension 30 and the rounded head 34. The receiving chamber 38 removably receives the work tool 28 of the hydraulic breaker 18 such that the extension 30 is in fitting engagement with the work tool 28. The extension 30 is designed to take up variation in vertical height between various industrial vehicles. As such, in various embodiments, the length of the extension 30 is in the approximate range of 50 mm to 500 mm although the length of the extension 30 may be in other ranges, such as, but not limited to, the approximate range of 170 mm to 350 mm, to accommodate the vertical height of particular industrial vehicles.

The adapter 32 includes an adapter body 44 disposed between a threaded end 46 and a mating end 48, which oppositely faces the threaded end 46. The adapter body 44 is substantially cylindrical. The adapter 32 further includes a mating cup 50 recessed into the adapter body 44 proximate the mating end 48. The mating cup 50 includes a flared cylindrical wall 52 that terminates at a curved seat 54 disposed in the adapter body 44. The mating cup 50 of the adapter 32 removably receives the extension 30 such that the curved seat 54 is in mating engagement with the rounded head 34 of the extension 30. The flared cylindrical wall 52 flares outwardly from the curved seat 54 towards the mating end 48 of the adapter 32. The flared cylindrical wall 52 provides alignment accommodation of the ball stud separator tool 10 with respect to the ground surface it is positioned on and a ball stud or pin-cylinder of an industrial vehicle.

The adapter 32 also includes a plurality of adapter threads 56 (e.g. threaded fastener) recessed into the adapter body 44 proximate the threaded end 46. The plurality of adapter threads 56 terminate at a stop 58 disposed in the adapter body 44. In some embodiments, the plurality of adapter threads 56 is internal threads. The plurality of adapter threads 56 are configured to threadably receive ball stud threads of a ball stud or pin-cylinder threads of a pin-cylinder. In some embodiments, the adapter further includes a sighting channel 59. The sighting channel 59 may be an aperture disposed cross-through the adapter body 44 to provide aid in verification and confirmation that the ball stud threads of the ball stud, for example, are fully threaded with the plurality of adapter threads 56 such that end of the ball stud sits on the stop 58 of the adapter 32. In some embodiments, the adapter 32 includes a plurality of flat surfaces 60 (exemplarily shown in FIG. 1) disposed on the exterior of the adapter body 44, forming a hexagonal profile, to assist in the fastening and unfastening of the adapter 32 to a ball stud or a pin-cylinder of an industrial vehicle.

Referring to FIGS. 1 and 3, the ball stud separator tool 10 further includes a hydraulic cylinder 62 coupled to the lower plate 12. The hydraulic cylinder 62 is in operable engagement with the upper plate 14. The hydraulic cylinder 62 is configured to selectively raise and lower the upper plate 14 slidably along the plurality of guide posts 16. In some embodiments, the hydraulic cylinder 62 includes a hand pump 64 for selectively raising and lowering the upper plate 14. The hand pump 64 includes a release valve 66 and includes, in some embodiments, a pressure gauge 68.

Figures 4, 5:
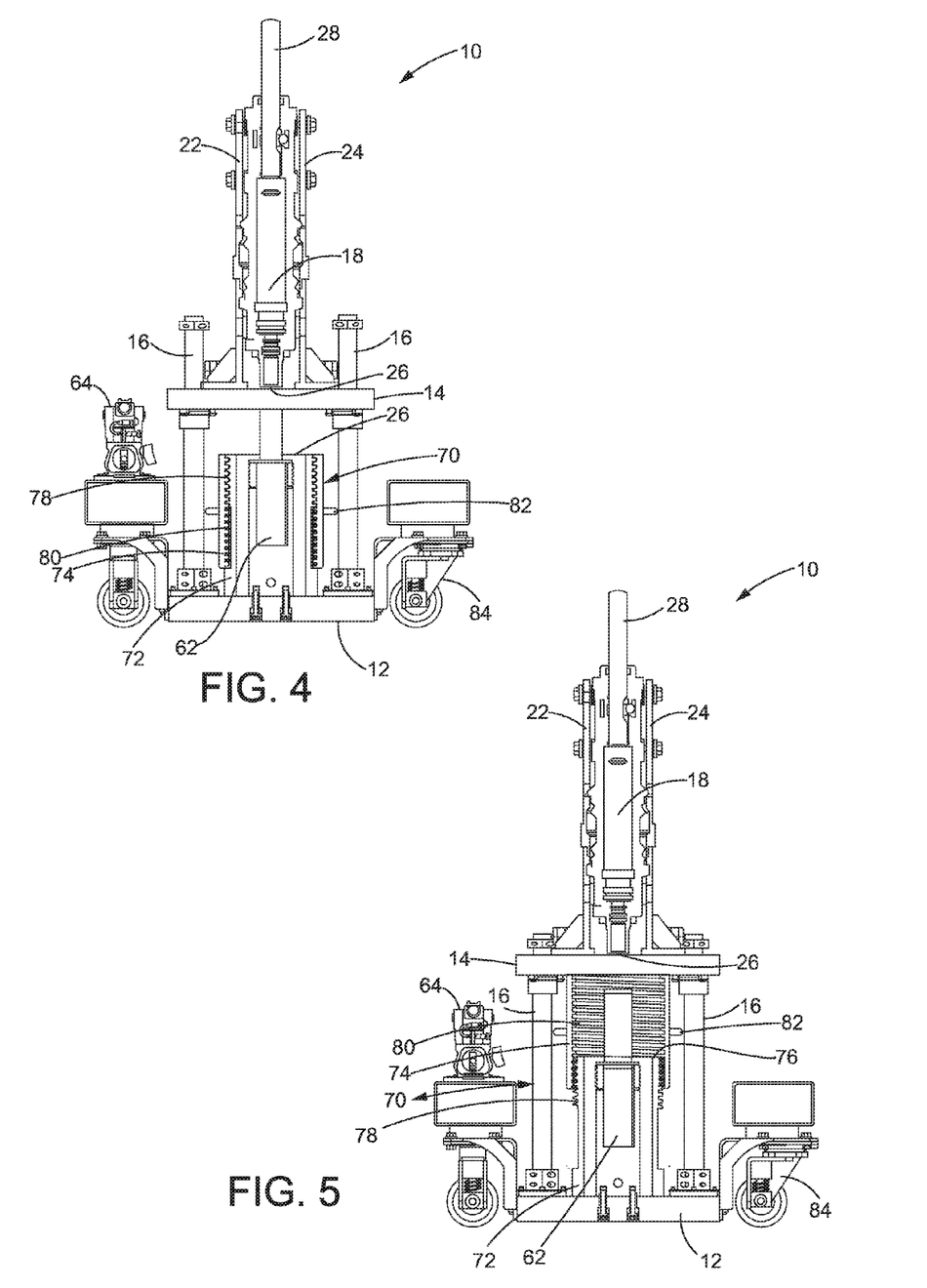
FIG. 4 is side view of a ball stud separator tool in an extended, unengaged state, in accordance with an embodiment of the present disclosure.
FIG. 5 is a side view of a ball stud separator tool in an extended, engaged state, in accordance with an embodiment of the present disclosure.

With particular reference to FIGS. 3-5, the ball stud separator tool 10 includes a load-lock 70. The load-lock 70 includes an inner housing 72 and an outer housing 74. The inner housing 72 of the load-lock 70 is coupled to, and extends vertically upward from, the lower plate 12. The inner housing 72 of the load-lock 70 is substantially cylindrical and houses the hydraulic cylinder 62 in such a manner that the hydraulic cylinder 62 is capable of operably extending vertically beyond an inner load-lock opening 76 of the inner housing 72. As such, the hydraulic cylinder 62 includes a retracted state, as illustrated in FIG. 3, and includes an extended state, as illustrated in FIGS. 4 and 5. The inner load-lock opening 76 is disposed on the inner housing 72 of the load-lock 70 at an end that is opposite from the end of the inner housing 72 that is coupled to the lower plate 12. Moreover, the outer housing 74 of the load-lock 70 surrounds the inner housing 72 of the load-lock 70 and is in operable threaded engagement therewith. In some embodiments, a first plurality of load-lock threads 78 is disposed on the exterior of the inner housing 72 and a second plurality of load-lock threads 80 is disposed on the interior of the outer housing 74 such that the first plurality of load-lock threads 78 is in operably threaded engagement with the second plurality of load-lock threads 80.

Furthermore, the outer housing 74 of the load-lock 70 is in operable engagement with the upper plate 14. In particular, the load-lock 70 includes an unengaged state, as illustrated in FIGS. 3 and 4, and includes an engaged state, as illustrated in FIG. 5. In the unengaged state, the outer housing 74 may be turned, in a counter clockwise direction for example, such that outer housing 74 travels vertically upwardly with respect to the inner housing 72 until the outer housing 74 reaches the engaged state, in which the outer housing 74 is in operable engagement with the upper plate 14. In some embodiments, the load-lock 70 includes a plurality of handles 82, which may extend radially outwardly from the outer housing 74, to facilitate turning the outer housing 74 with respect to the inner housing 72.

Referring back to FIG. 1, the ball stud separator tool 10 includes a plurality of casters 84 coupled to the lower plate 12. In some embodiments, the plurality of casters 84 is spring loaded such that the lower plate 12 is capable of vertical movement between a raised state and a bottomed state. In the raised state, the lower plate 12 is raised above a ground surface such that the ball stud separator tool 10 is movable via the plurality of casters 84. In the bottomed state, on the other hand, the lower plate 12 is in surface contact and firmly sits on the ground surface as a result of a load (e.g. 1 k-2 k lbs.) exerted on the ball stud separator tool 10 compressing the spring loaded plurality of casters 84. In some embodiments, the ball stud separator tool 10 also includes a push handle 86 disposed on the lower plate 12.

INDUSTRIAL APPLICABILITY

Figure 6:
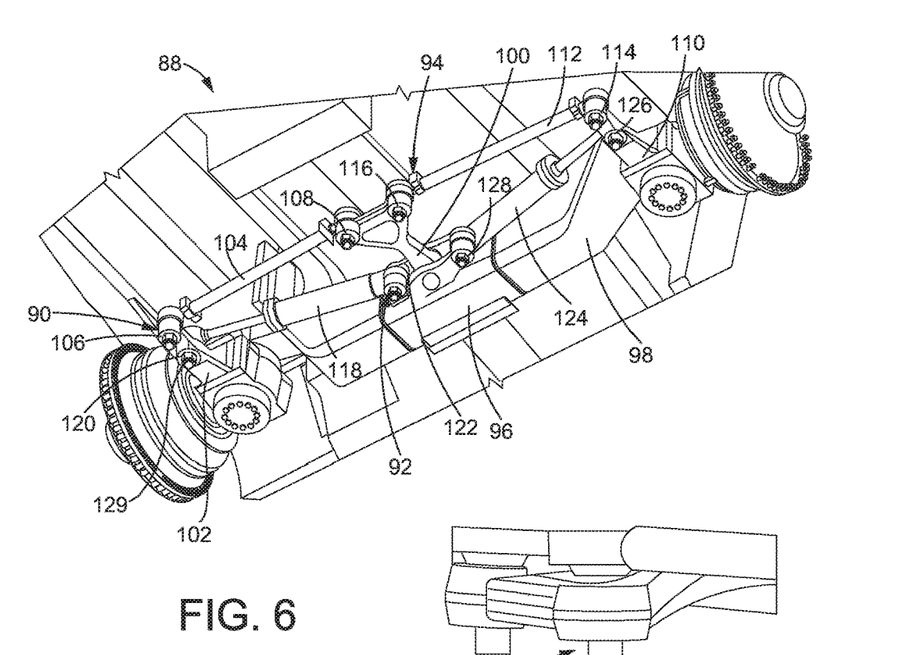
FIG. 6 is a perspective view of a steering assembly of an industrial vehicle, in accordance with an embodiment of the present disclosure.

In general, the present disclosure may find applicability with industrial vehicles, such as industrial vehicle 88 exemplarily illustrated in FIG. 6, utilized in any number of industries such as, but not limited to, construction, agriculture, earth-moving, and mining. As non-limiting examples, the industrial vehicle 88 may be an off-highway truck, an on-highway truck, a wheel dozer, a wheel loader, and other well-known large industrial vehicles. By utilizing the systems and methods disclosed herein, the ball stud separator tool 10 may separate ball studs and pin-cylinders from corresponding bores associated with steering assemblies of industrial vehicles while minimizing or eliminating damage to other steering assembly components during the separation process. As a result, the ball stud separator tool 10 may also reduce the down time of the industrial vehicles being serviced as the steering assembly components may not be damaged during the separation process and would not require time-consuming repair or replacement. Moreover, the ball stud separator tool 10 may also eliminate the use of a conventional industrial floor jack to raise the industrial vehicle during the separation process, which may be contrasted with previous systems and methods wherein the weight of an industrial vehicle may drop against the conventional industrial floor jack after the ball stud is separated.

Figure 7:
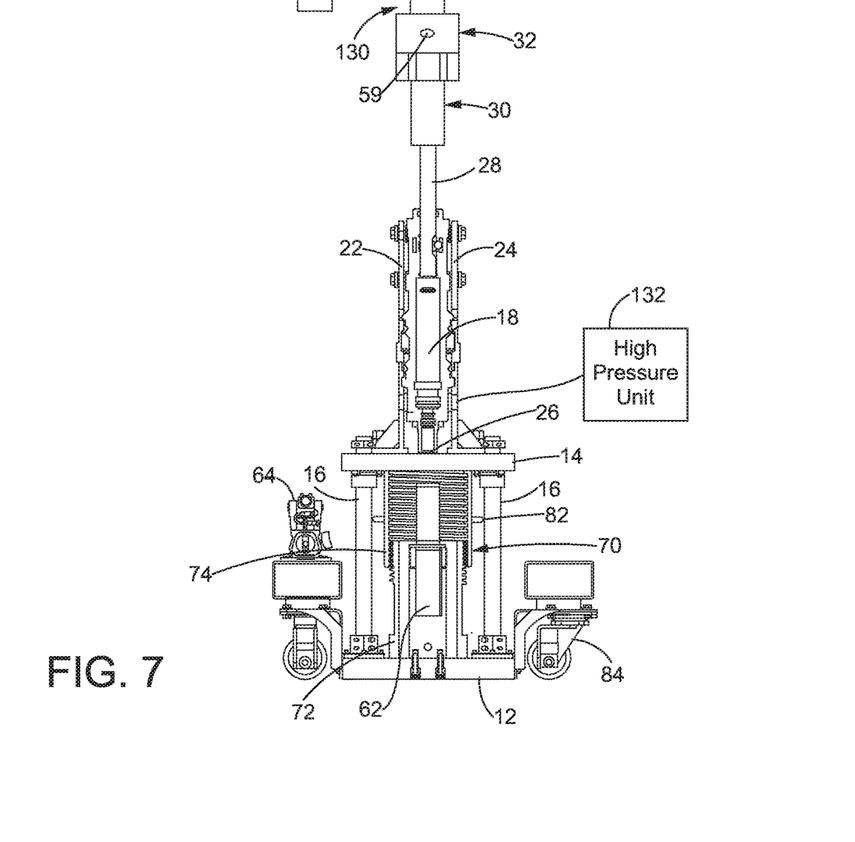
FIG. 7 is a perspective view of a ball stud separator tool in an extended, engaged state illustrating an adapter of the ball stud separator tool in operable engagement with a ball stud of an industrial vehicle.

For example, with reference to FIGS. 6 and 7, the ball stud separator tool 10 may be utilized to separate a plurality of ball studs 90 or a plurality of pin-cylinders 92 from corresponding bores on a steering assembly 94 of the industrial vehicle 88. The steering assembly 94 includes a steering box 96 disposed on a frame 98 of the industrial vehicle 88. The steering assembly 94 also includes a center arm 100, which may extend from the steering box 96. The center arm 100 is operably coupled to a first steering arm 102 via a first steering link 104 such that the first steering link 104 is coupled to the first steering arm 102 via a first ball stud 106 and is coupled to the center arm 100 via a second ball stud 108. Similarly, the center arm 100 is operably coupled to a second steering arm 110 via a second steering link 112 such that the second steering link 112 is coupled to the second steering arm 110 via a third ball stud 114 and is coupled to the center arm 100 via a fourth ball stud 116.

The first steering arm 102 is also operably coupled to the steering box 96 via a first steering cylinder 118 such that the first steering cylinder 118 is coupled to the first steering arm 102 via a fifth ball stud 120 and is coupled to the steering box 96 via a first pin-cylinder 122. Similarly, the second steering arm 110 is operably coupled to the steering box 96 via a second steering cylinder 124 such that the second steering cylinder 124 is coupled to the second steering arm 110 via a sixth ball stud 126 and is coupled to the steering box 96 via a second pin-cylinder 128.

In operation, the ball stud separator tool 10 may be utilized to separate any one of the ball studs 106, 108, 114, 116, 120, 126 of the plurality of ball studs 90 and any one of the pin-cylinders 122, 128 of the plurality of pin-cylinders 92. Each of the plurality of ball studs 106, 108, 114, 116, 120, 126 includes a plurality of ball stud threads 129. For example, with a corresponding retain nut of the fourth ball stud 116 removed, the adapter 32 may be threaded onto the fourth ball stud 116 until the fourth ball stud 116 reaches the stop 58 of the adapter 32. In this manner, a clearance 130 is arranged between the adapter 32 and, in this example, the center arm 100 of the industrial vehicle 88. The clearance 130 provides a safety feature as the fourth ball stud 116 is retained by the adapter 32 and prevented from shooting out of center arm 100 during the separation process. With the adapter 32 threaded into place on the fourth ball stud 116, the ball stud separator tool 10, with the appropriately selected extension 30 associated with the particular height of the industrial vehicle 88 being in fitting engagement with the work tool 28, may be wheeled under the industrial vehicle 88 and aligned with the adapter 32. At this point, the hydraulic cylinder 62 is in the retracted state and the load-lock is in the unengaged state.

After the ball stud separator tool 10 is properly aligned, the hydraulic cylinder 62 is engaged (e.g. the hand pump 64 may be pumped) such that the hydraulic cylinder 62 operably engages and vertically raises the upper plate 14 until the rounded head 34 of the extension 30 mates with the curved seat 54 of the adapter 32. The hydraulic cylinder 62 continues to be engaged so that the extension 30 is forced against the adapter 32 until a load is applied to the ball stud separator tool 10 resulting in the spring-load plurality of casters 84 into the bottomed state such that the lower plate 12 sits firmly on the ground surface. Moreover, if the ground surface happens to be uneven, the flared cylindrical wall 52 of the adapter 32 provides adjustment for the extension 30 to properly align.

In this arrangement, the load-lock 70 may be engaged such that the outer housing 74 is turned, with respect to the inner housing 72, from the unengaged state to the engaged state. In the engaged state, the outer housing 74 is in operable locking engagement with the upper plate 14 creating a rigid structure and force path between the ground surface and the fourth ball stud 116. The hydraulic cylinder 62 may then be retracted to prevent damage thereto during operation of the hydraulic breaker 18. The hydraulic breaker 18 of the ball stud separator tool 10 may then be engaged, via a high pressure unit 132 operably coupled thereto, to impart a shock (e.g. impact force) and frequency (e.g. blows per minute) to the fourth ball stud 116 until separation of the fourth ball stud 116 from a corresponding bore occurs.

Figure 8:
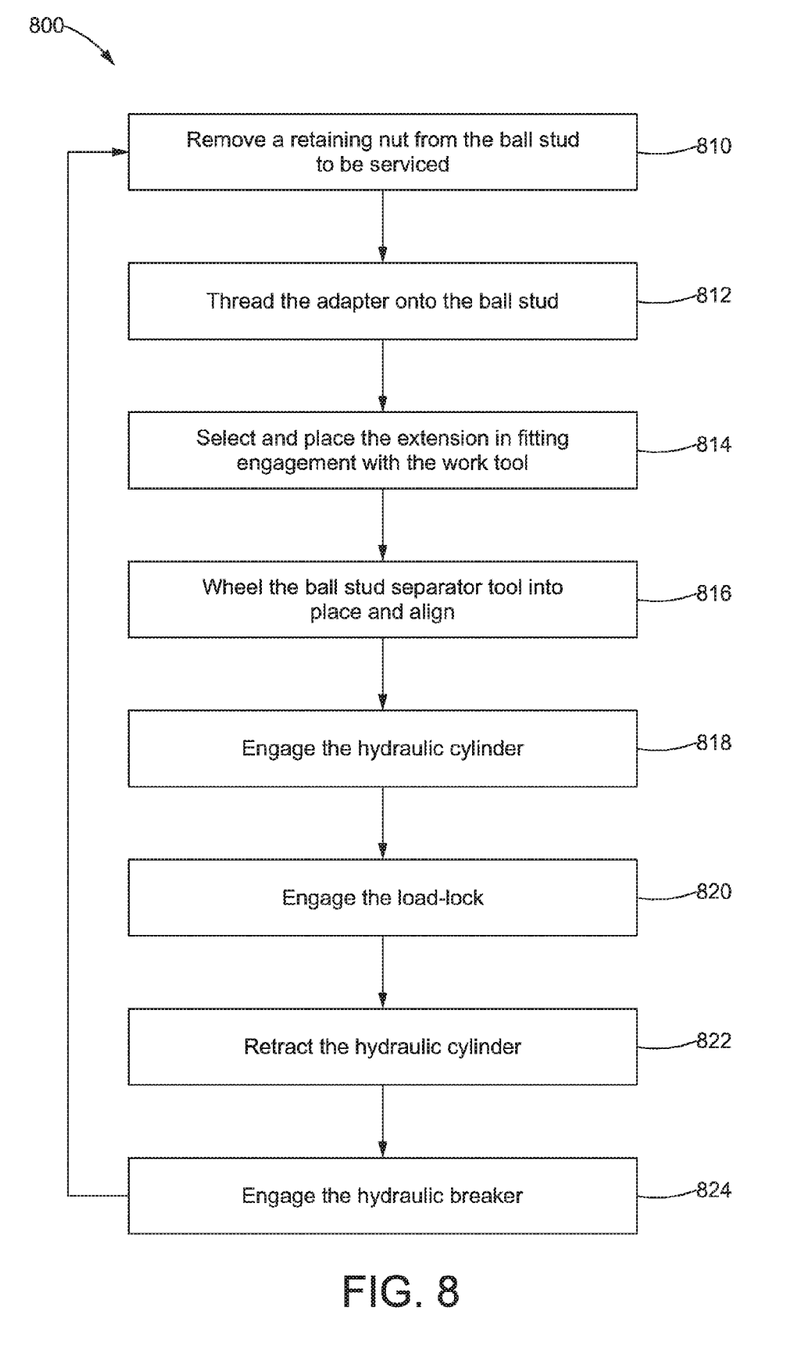
FIG. 8 is a block diagram illustrating a sample sequence which may be practiced in accordance with the teachings of the present disclosure.

FIG. 8 illustrates a block diagram 800 of a sample sequence which may be performed to separate a ball stud from a corresponding bore. As illustrated in block 810, a retaining nut of the ball stud to be serviced may be removed. The adapter 32 may be threaded onto the ball stud, as illustrated in block 812. Block 814 illustrates an appropriately selected extension 30 being placed in fitting engagement with the work tool 28 of the hydraulic breaker 18. The ball stud separator tool 10 may then be wheeled into place under the industrial vehicle 88 and aligned with the adapter 32, as illustrated in block 816. The hydraulic cylinder 62 may then be engaged until the rounded head 34 of the extension 30 mates with the curved seat 54 of the adapter 32 and the plurality of casters 84 reach the bottomed state so that the lower plate 12 sits on the ground surface, as illustrated in block 818.

As illustrated in block 820, the load-lock 70 is engaged into supporting contact with the upper plate 14. The hydraulic cylinder 62 may then be retracted via the release valve 66, as illustrated in block 822. Block 824 illustrates operation of the hydraulic breaker 18 via the high pressure unit 132 to impart shocks to the ball stud for separation. Once the ball stud is separated, the adapter 32 may be unthreaded therefrom and the sequence may be repeated as illustrated by the return path back to block 810.

What is claimed is:

1. An adapter for a ball stud separator tool, the adapter comprising:
   a cylindrical body including a threaded end and a mating end oppositely facing the threaded end, the cylindrical body further includes a sighting channel disposed through the threaded end;
   a plurality of adapter threads recessed into the cylindrical body proximate the threaded end, the plurality of adapter threads configured to threadably receive a plurality of ball stud threads of a ball stud; and
   a flared cylindrical wall recessed into the cylindrical body proximate the mating end, the flared cylindrical wall terminated at a curved seat disposed in the cylindrical body.

2. The adapter of claim 1, wherein the flared cylindrical wall is configured to operably receive an extension of the ball stud separator tool.

3. The adapter of claim 2, wherein the flared cylindrical wall flares outwardly from the curved seat to the mating end of the cylindrical body.

4. The adapter of claim 3, wherein the curved seat is configured to matingly receive a rounded head of the extension of the ball stud separator tool.

5. The adapter of claim 1, wherein the plurality of adapter threads terminate at a stop disposed in the cylindrical body.

6. A ball stud separator tool, comprising:
   a lower plate;
   a plurality of guide posts extending upwardly from the lower plate;
   an upper plate slidably coupled to the plurality of guide posts;
   a hydraulic cylinder coupled to the lower plate, the hydraulic cylinder operably engageable with the upper plate;
   a load-lock coupled to the lower plate and housing the hydraulic cylinder, the load-lock operably engageable with the upper plate;
   a hydraulic breaker coupled to the upper plate, the hydraulic breaker including a work tool;
   an extension including a rounded head and a receiving chamber, the receiving chamber receivably engaged with the work tool; and
   an adapter including a mating cup and a threaded fastener, the mating cup receivably engaged with the rounded head of the extension, the threaded fastener configured to threadably engage a ball stud.

7. The ball stud separator tool of claim 6, wherein the mating cup is recessed into the adapter and includes a flared cylindrical wall terminating at a curved seat disposed in the adapter.

8. The ball stud separator tool of claim 7, wherein the flared cylindrical wall flares outwardly from the curved seat.

9. The ball stud separator tool of claim 8, wherein the curved seat receivably engages the rounded head of the extension in mating engagement.

10. The ball stud separator tool of claim 6, wherein a first plurality of load-lock threads is disposed on an inner housing of the load-lock and a second plurality of load-lock threads is disposed in an outer housing of the load-lock, the first plurality of load-lock threads is in operable threaded engagement with the second plurality of load-lock threads.

11. The ball stud separator tool of claim 10, wherein the load-lock includes a plurality of handles extending radially outwardly therefrom.

12. The ball stud separator tool of claim 6, wherein the hydraulic cylinder includes a hand pump configured to selectively raise the upper plate along the plurality of guide posts.

13. The ball stud separator tool of claim 12, wherein the hand pump includes a release valve.

14. The ball stud separator tool of claim 13, wherein the hand pump includes a pressure gauge.

15. The ball stud separator tool of claim 6, further including a plurality of spring-loaded casters operably coupled to the lower plate.

16. The ball stud separator tool of claim 6, wherein the hydraulic breaker further includes a plurality of brackets coupling the hydraulic breaker to the upper plate.

17. A ball stud separator system for an industrial vehicle, comprising:
   a lower plate;
   a hydraulic cylinder coupled to the lower plate;
   an upper plate in movable engagement with the hydraulic cylinder;
   a load-lock coupled to the lower plate and housing the hydraulic cylinder, the load-lock operably engageable with the upper plate;
   a hydraulic breaker coupled to the upper plate, the hydraulic breaker including a work tool;
   an extension including a rounded head and a receiving chamber, the receiving chamber receivably engaged with the work tool; and
   an adapter including a mating cup and a threaded fastener, the mating cup including a flared cylindrical wall terminating at a curved seat, the curved seat receivably engaged with the rounded head of the extension, the threaded fastener threadably engageable with a ball stud of the industrial vehicle.

18. The ball stud separator system of claim 17, wherein the threaded fastener of the mating cup terminates at a stop disposed in the adapter, the ball stud engageable with the stop establishing a clearance between the adapter and the industrial vehicle.

19. The ball stud separator system of claim 17, further including a high pressure unit operably coupled to the hydraulic breaker.

20. The ball stud separator system of claim 17, further including a plurality of spring-loaded casters operably coupled to the lower plate.

\* \* \* \* \*